United States Patent
Alecu

(10) Patent No.: US 10,760,484 B2
(45) Date of Patent: Sep. 1, 2020

(54) MULTI-ENGINE AIRCRAFT POWER PLANT WITH HEAT RECUPERATION

(71) Applicant: Pratt & Whitney Canada Corp., Longueuil (CA)

(72) Inventor: Daniel Alecu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 542 days.

(21) Appl. No.: 15/267,736

(22) Filed: Sep. 16, 2016

(65) Prior Publication Data

US 2018/0080378 A1 Mar. 22, 2018

(51) Int. Cl.
| | | |
|---|---|---|
| *F02C 7/10* | (2006.01) | |
| *F02C 6/02* | (2006.01) | |
| *F02C 3/04* | (2006.01) | |
| *F02C 6/18* | (2006.01) | |
| *F02C 6/20* | (2006.01) | |

(52) U.S. Cl.
CPC .................. *F02C 6/02* (2013.01); *F02C 3/04* (2013.01); *F02C 6/18* (2013.01); *F02C 6/20* (2013.01); *F02C 7/10* (2013.01); *F05D 2220/60* (2013.01); *F05D 2220/90* (2013.01)

(58) Field of Classification Search
CPC ...... F02C 7/08; F02C 7/10; F02C 6/02; F02C 6/18; F02C 6/20; F02C 7/262
See application file for complete search history.

(56) References Cited

U.S. PATENT DOCUMENTS

| | | | | |
|---|---|---|---|---|
| 2,814,181 A | * | 11/1957 | Schwartz ................. | F02C 7/08 60/39.15 |
| 3,068,647 A | | 12/1962 | Santamaria et al. | |
| 3,749,047 A | * | 7/1973 | Tamaru ..................... | F02C 3/36 440/4 |
| 3,765,170 A | * | 10/1973 | Nakamura .............. | F02C 6/003 60/39.17 |
| 3,869,862 A | * | 3/1975 | Dickey ..................... | F02C 6/02 244/17.11 |

(Continued)

FOREIGN PATENT DOCUMENTS

| | | | | |
|---|---|---|---|---|
| FR | | 3068077 A1 * | 12/2018 | ................ F02C 6/18 |
| WO | WO-2018234684 A1 * | | 12/2018 | ................ F02C 3/10 |

OTHER PUBLICATIONS

Norton Rose Fulbright Canada LLP, Response to Office Action dated May 25, 2018 re: application No. 2,965,946.

(Continued)

*Primary Examiner* — William H Rodriguez
(74) *Attorney, Agent, or Firm* — Norton Rose Fulbright Canada LLP

(57) ABSTRACT

Multi-engine aircraft power plants and associated operating methods are disclosed. An exemplary multi-engine power plant comprises a first turboshaft engine and a second turboshaft engine configured to drive a common load such as a rotary wing of an aircraft; and a heat exchanger in thermal communication with an exhaust gas of the first turboshaft engine and in thermal communication with pre-combustion air of the second turboshaft engine. The heat exchanger is configured to permit heat transfer from the exhaust gas of the first turboshaft engine to the pre-combustion air of the second turboshaft engine.

14 Claims, 5 Drawing Sheets

(56) References Cited

U.S. PATENT DOCUMENTS

| | | | | |
|---|---|---|---|---|
| 4,137,721 A | * | 2/1979 | Glennon | F02C 9/42 |
| | | | | 60/711 |
| 4,147,024 A | * | 4/1979 | Moellmann | F02C 6/02 |
| | | | | 60/39.15 |
| 9,353,642 B2 | | 5/2016 | Certain | |
| 9,458,771 B2 | * | 10/2016 | Ling | F02C 9/42 |
| 2013/0086919 A1 | | 4/2013 | Dooley et al. | |
| 2013/0098052 A1 | * | 4/2013 | Bedrine | F02C 1/04 |
| | | | | 60/772 |
| 2013/0139518 A1 | | 6/2013 | Morgan | |
| 2013/0219905 A1 | | 8/2013 | Marconi et al. | |
| 2016/0003144 A1 | * | 1/2016 | Kupratis | B64D 35/08 |
| | | | | 60/771 |
| 2016/0237900 A1 | | 8/2016 | Thiriet et al. | |
| 2017/0101938 A1 | | 4/2017 | Lescher et al. | |
| 2017/0334569 A1 | * | 11/2017 | Marin | B64C 27/04 |

OTHER PUBLICATIONS

Canadian Intellectual Property Office, Office Action dated May 25, 2018 re: application No. 2,965,946.

* cited by examiner

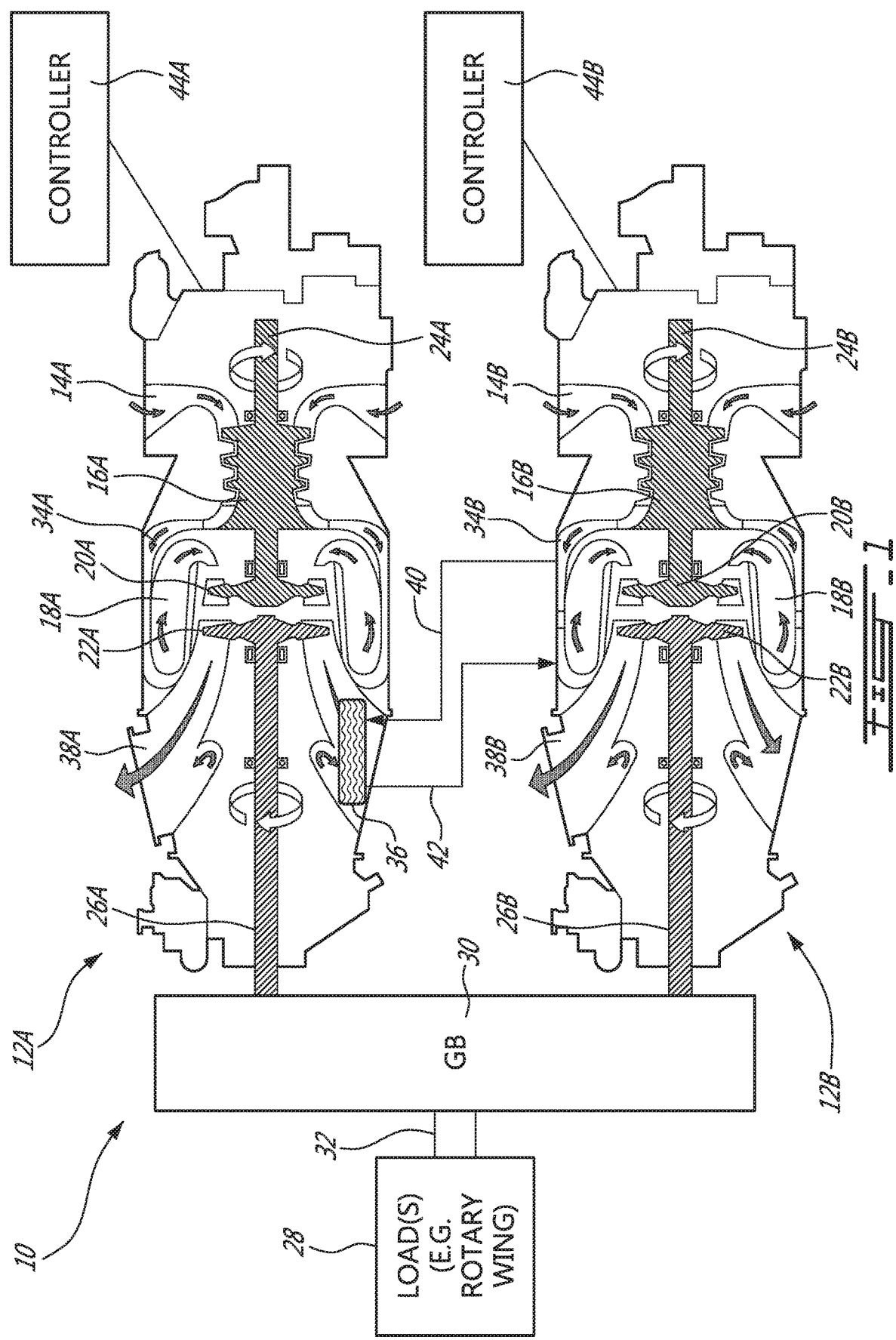

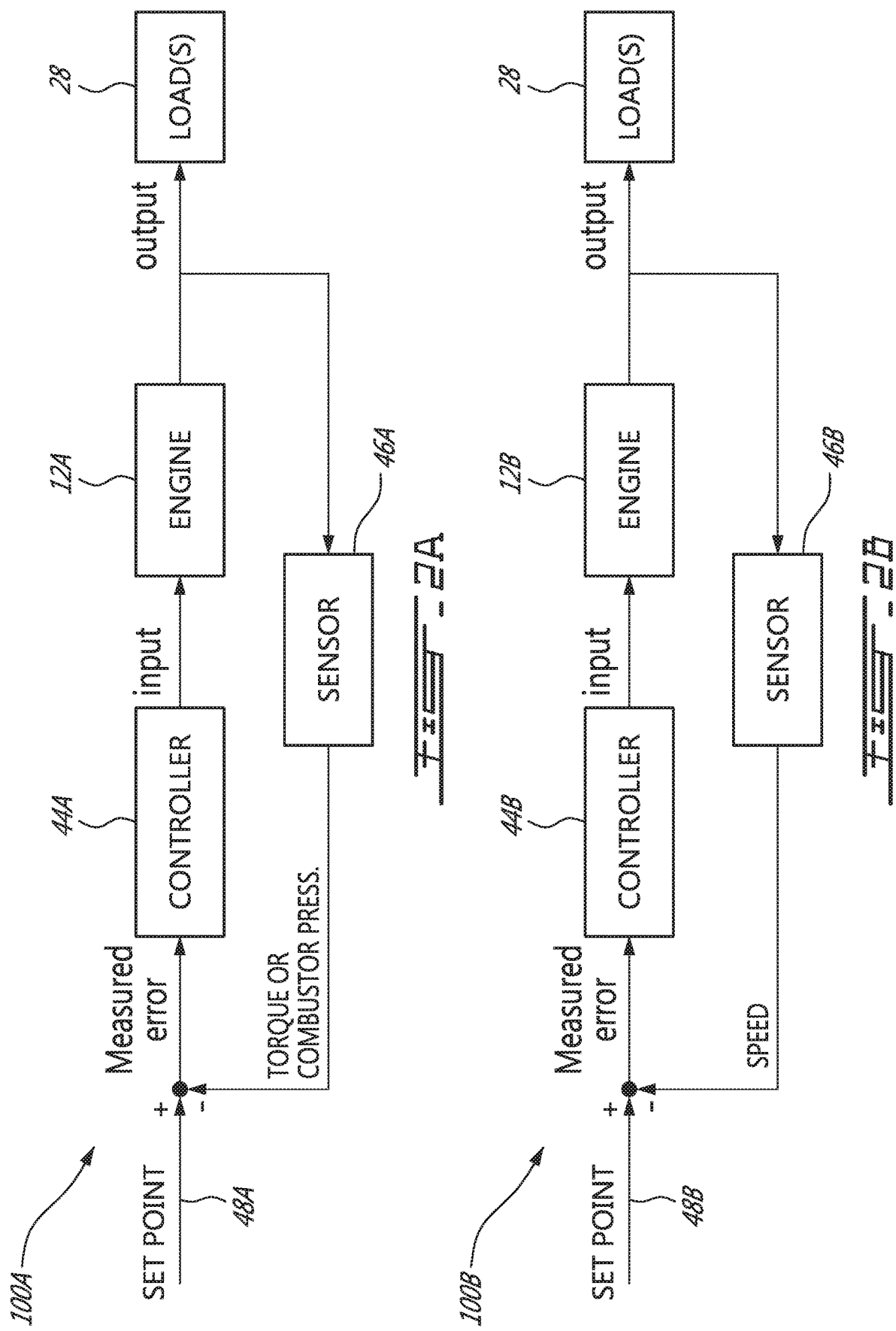

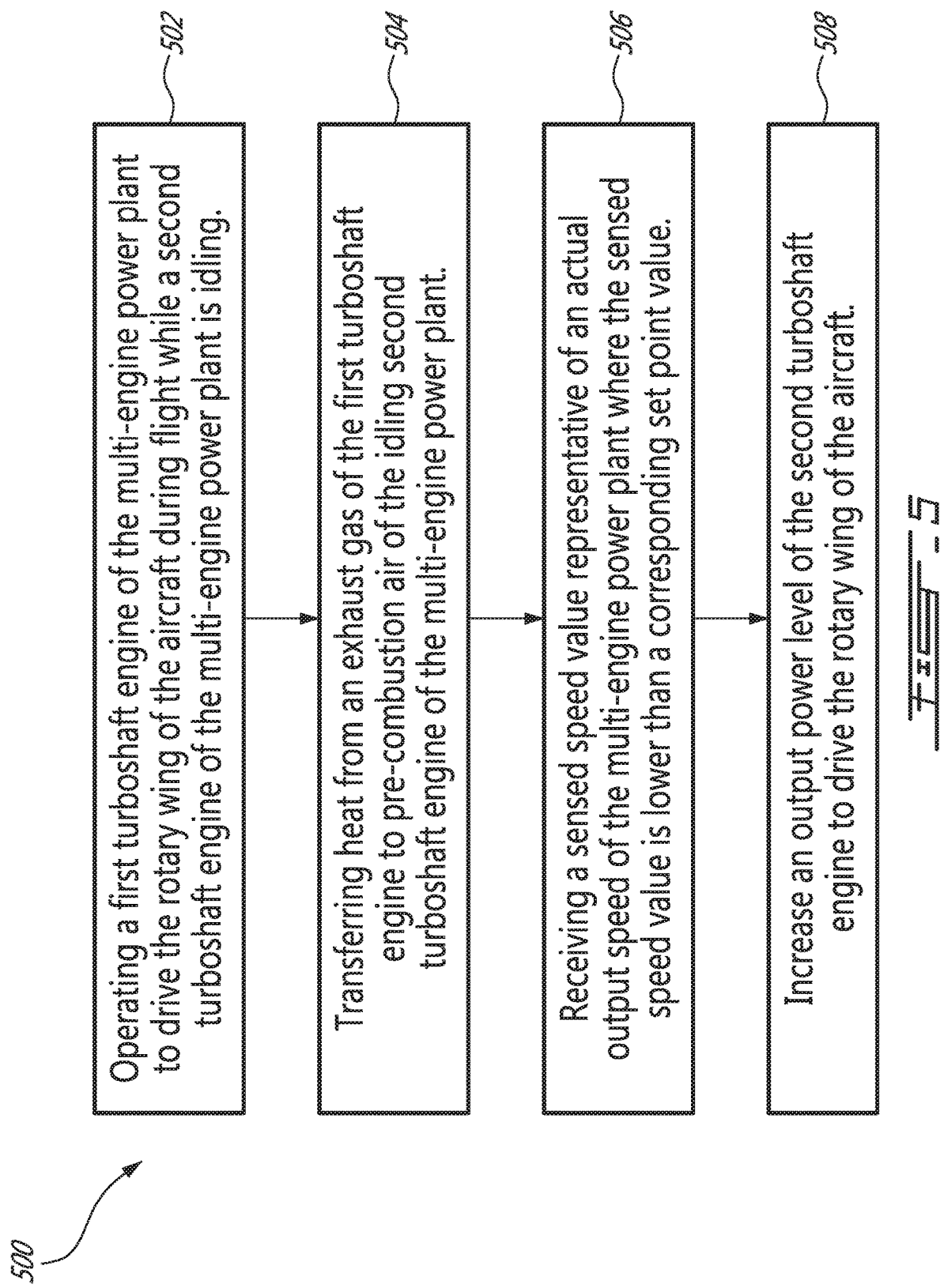

MULTI-ENGINE AIRCRAFT POWER PLANT WITH HEAT RECUPERATION

TECHNICAL FIELD

The disclosure relates generally to multi-engine power plants for aircraft applications, and more particularly to the operation multi-engine power plants for rotary-wing aircraft.

BACKGROUND OF THE ART

Twin-engine helicopters typically require both engines to operate at a relatively high power output during some phases of flight such as during take-off, for example. During other phases of flight such as cruise, power requirements may be significantly lower and therefore the power output from each engine may be significantly reduced. Even though only one of the two engines may be required during such other phases, it is typically required for safety reasons that both engines remain operating at all times during flight. In an emergency condition such as failure of one of the two engines, this allows the other engine to rapidly increase its power output to make up for the failed engine and take over. When the helicopter is at low altitude, it is imperative that the power output increase by the remaining engine be done as rapidly as possible.

When both engines of a twin-engine helicopter are operating at reduced power output, they are typically not operating within an optimum performance window of the engines. Consequently, depending on the type of mission, both engines of the helicopter operating at a reduced power output setting may operate at a relatively low fuel efficiency (i.e. relatively high fuel consumption) for relatively long portions of a flight. Improvement is desirable.

SUMMARY

In one aspect, the disclosure describes a method of operating a multi-engine power plant drivingly coupled to a rotary wing of an aircraft during flight of the aircraft. The method comprises:

operating a first turboshaft engine of the multi-engine power plant to drive the rotary wing of the aircraft during flight while a second turboshaft engine of the multi-engine power plant is idling;

transferring heat from an exhaust gas of the first turboshaft engine to pre-combustion air of the idling second turboshaft engine of the multi-engine power plant;

receiving a sensed speed value representative of an actual output speed of the multi-engine power plant where the sensed speed value is lower than a corresponding set point value; and increasing an output power level of the second turboshaft engine to drive the rotary wing of the aircraft.

The method may comprise transferring heat to the pre-combustion air at a location along a gas path of the second turboshaft engine downstream of a compressor stage of the second turboshaft engine.

The method may comprise:

receiving the pre-combustion air from a location along a gas path of the second turboshaft engine downstream of a compressor stage of the second turboshaft engine;

directing the pre-combustion air toward a heat exchanger in thermal communication with the exhaust gas of the first turboshaft engine; and directing the pre-combustion air from the heat exchanger to a location along the gas path of the second turboshaft engine upstream of a combustor of the second turboshaft engine.

The heat exchanger may be disposed inside an exhaust duct of the first turboshaft engine.

The method may comprise operating the first turboshaft engine at a substantially constant output power level while the output power level of the second turboshaft engine is increased.

The method may further comprise, after increasing the output power level of the second turboshaft engine, modulating the output power level of the second turboshaft engine based on a difference between the sensed speed value representative of the actual output speed of the multi-engine power plant and the corresponding set point value.

The method may comprise operating the first turboshaft engine at a substantially constant output power level while the output power level of the second turboshaft engine is modulated.

Embodiments may include combinations of the above features.

In another aspect, the disclosure describes a method of operating a multi-engine power plant of an aircraft. The method comprises:

using a first turboshaft engine of the multi-engine power plant to drive a load while a second turboshaft engine of the multi-engine power plant is idling; and transferring heat from the first turboshaft engine to the second turboshaft engine of the multi-engine power plant to assist with the idling of the second turboshaft engine.

The method may comprise transferring heat from an exhaust gas of the first turboshaft engine to pre-combustion air of the second turboshaft engine of the multi-engine power plant.

The method may comprise transferring heat to the pre-combustion air at a location along a gas path of the second turboshaft engine downstream of a compressor stage of the second turboshaft engine.

The load may be a rotary wing of the aircraft and the aircraft may be in flight while the second turboshaft engine is idling.

The method may further comprise modulating an output power level of the second turboshaft engine based on a difference between an operating speed of the load and a corresponding set point value.

The method may comprise operating the first turboshaft engine at a substantially constant output power level while the output power level of the second turboshaft engine is modulated.

The method may comprise:

receiving a sensed operating speed of the load that is lower than a corresponding set point value; and increasing an output power level of the second turboshaft engine.

The method may comprise operating the first turboshaft engine at a substantially constant output power level while the output power level of the second turboshaft engine is increased.

Embodiments may include combinations of the above features.

In a further aspect, the disclosure describes a multi-engine power plant for an aircraft. The power plant comprises:

a first turboshaft engine and a second turboshaft engine, the first turboshaft engine and the second turboshaft engine being configured to drive a common load; and a heat exchanger in thermal communication with an exhaust gas of the first turboshaft engine and in thermal communication with pre-combustion air of the second turboshaft engine, the heat exchanger being configured to, in use, permit heat transfer from the exhaust gas of the first turboshaft engine to the pre-combustion air of the second turboshaft engine.

The power plant may comprise a first duct configured to receive the pre-combustion air from a location along a gas path of the second turboshaft engine downstream of a compressor stage of the second turboshaft engine and direct the pre-combustion air toward the heat exchanger.

The power plant may comprise a second duct configured to direct the pre-combustion air from the heat exchanger to a location along the gas path of the second turboshaft engine upstream of a combustor of the second turboshaft engine.

The heat exchanger may be disposed inside an exhaust duct of the first turboshaft engine.

The power plant may comprise:

a first control loop for controlling the first turboshaft engine based on a desired output power level of the first turboshaft engine; and a second control loop for controlling the second turboshaft engine based on a desired operating speed of the common load.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 1 is a schematic representation of an exemplary multi-engine power plant for an aircraft showing axial cross-section views of two exemplary turboshaft engines;

FIG. 2A is a schematic representation of a first control loop for controlling a first engine of the multi-engine power plant of FIG. 1;

FIG. 2B is a schematic representation of a second control loop for controlling a second engine of the multi-engine power plant of FIG. 1;

FIG. 5 is a flowchart illustrating an exemplary method of operating the multi-engine power plant of FIG. 1 drivingly coupled to a rotary wing of an aircraft during flight of the aircraft.

DETAILED DESCRIPTION

Figure 3B:
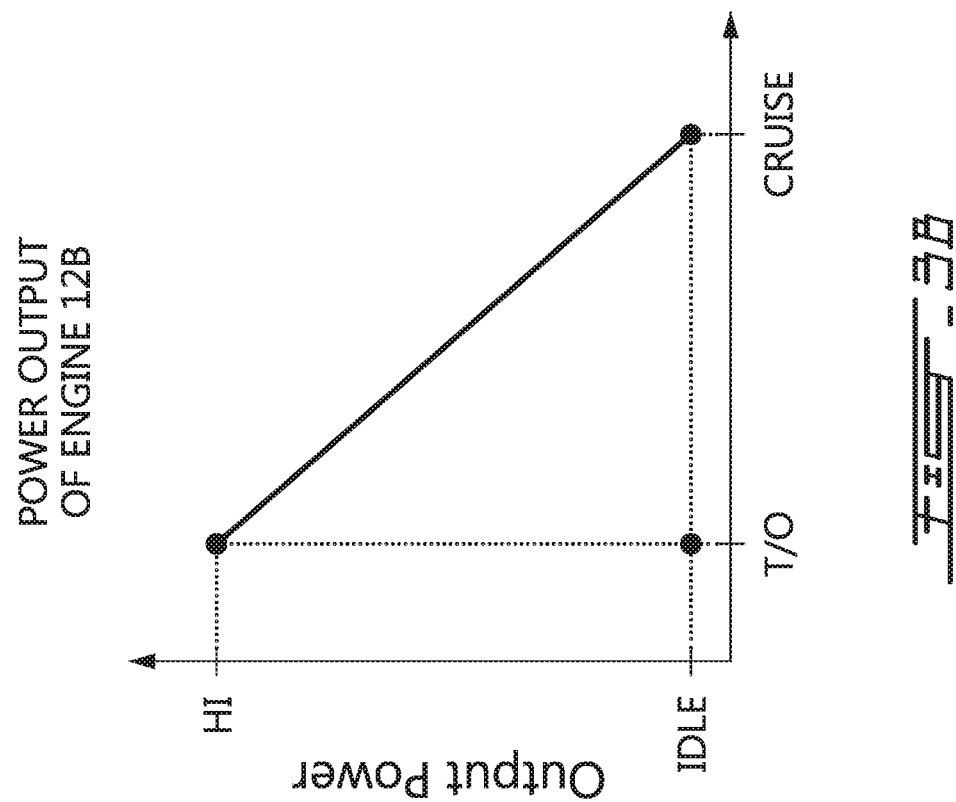
FIG. 3B is a graph illustrating exemplary output power levels of the second engine of the multi-engine power plant of FIG. 1 during take-off and a cruise phase of flight of the aircraft.

The present disclosure relates to configurations of multi-engine power plants for (e.g., rotary-wing) aircraft applications and associated methods of operation. In some embodiments, the disclosed configurations of multi-engine power plants may allow one engine of the power plant to idle when not needed and allow such engine to increase its out power level relatively rapidly when needed to supplement the driving engine or to take over for the driving engine in the event of a failure of the driving engine. In some embodiments, a cross-engine heat recuperation system may transfer waste heat from the driving engine to the idling engine in order to reduce the fuel consumption of the idling engine. In some embodiments, control (e.g., modulating) of the idling engine may be based on an operating speed of the load (e.g., main rotor of a helicopter) drivingly coupled to the multi-engine power plant so that a separate dedicated engine failure detection system may not be required to cause the idling engine to power-up and take over for a failure of the driving engine.

In various embodiments, systems and methods disclosed herein may permit one engine of a multi-engine power plant drivingly coupled to a main rotor of a helicopter to reduce its output power level after takeoff and/or during a cruise phase of flight of the helicopter in order to reduce overall fuel consumption when power from the other engine(s) of the multi-engine power plant is sufficient to drive the main rotor. For example, instead of having two engines of a multi-engine power plant operating at lower output power levels, it may be more fuel efficient, to operate one engine at a higher output power level while the other engine is idling and waste heat is transferred thereto from the driving engine.

Aspects of various embodiments are described through reference to the drawings.

FIG. 1 is a schematic representation of an exemplary multi-engine (e.g., twin-pack) power plant 10 for an aircraft showing axial cross-section views of two exemplary turboshaft engines 12A and 12B. It is understood that aspects of the present disclosure are not limited to engines of the turboshaft type and may be applicable to other types of gas turbine engines. Each of turboshaft engines 12A, 12B may be of a type suitable for use in aircraft applications for subsonic flight for example. Each of turboshaft engines 12A, 12B may comprise, in serial flow communication, air intake 14A, 14B through which ambient air is received, multistage compressor 16A, 16B for pressurizing the air, combustor 18A, 18B in which the compressed air is mixed with fuel and ignited for generating an annular stream of hot combustion gases, and a turbine section for extracting energy from the combustion gases. The turbine section may comprise one or more high-pressure turbines 20A, 20B and one or more low-pressure power turbines 22A, 22B. High-pressure turbine(s) 20A, 20B may be drivingly coupled to compressor 16A, 16B via high-pressure shaft 24A, 24B to form a high-pressure spool. Power turbine(s) 22A, 22B may be coupled to low-pressure power shaft 26A, 26B to form a low-pressure spool. Accordingly, each of turboshaft engines 12A, 12B may have a dual-spool configuration.

In some embodiments, first turboshaft engine 12A and second turboshaft engine 12B may be of substantially identical constructions and may have substantially identical power output ratings. Alternatively, in some embodiments, first turboshaft engine 12A and second turboshaft engine 12B may be of different constructions and may have different power output ratings. In some embodiments, multi-engine power plant 10 may comprise more than two engines.

First turboshaft engine 12A and second turboshaft engine 12B may be configured to drive a common load 28. In some embodiments, load 28 may comprise a rotary wing of a rotary-wing aircraft. For example, load 28 may be a main rotor of a helicopter. Depending on the type of load 28 and on the operating speed thereof, each of turboshaft engine 12A, 12B may be drivingly coupled to load 28 via gear box 30, which may be of a speed-changing (e.g., reducing) type. For example, gear box 30 may have a plurality of inputs to receive mechanical energy from respective power shafts 26A, 26B of respective turboshaft engines 12A, 12B. Gear box 30 may be configured to direct at least some of the combined mechanical energy from the plurality of turboshaft engines 12A, 12B toward a common output shaft 32 for driving load 28 at a suitable operating (e.g., rotational) speed. It is understood that multi-engine power-plant 10 may be configured to also drive other accessories of an associated aircraft for example. Gear box 30 may be configured to permit load 28 to be driven by either first turboshaft engine 12A or second turboshaft engine 12B, or, by both first turboshaft engine 12A and second turboshaft engine 12B together.

In some situations, it may be desirable (e.g., for improved fuel economy) to drive load 28 using mainly first turboshaft engine 12A at a relatively high output power level, which may be a more fuel efficient operating regime while, second turboshaft engine 12B is idling (e.g., flight idle). Such situations may include a cruise phase of flight of the aircraft for example. Having second turboshaft engine 12B idling instead of being shut down may permit second turboshaft engine 12B to remain ready to rapidly power-up in an emergency situation such as a failure of first turboshaft engine 12A driving a main rotor of a helicopter, or other situation(s). Such other situations may include a climb or other manoeuver(s) performed by the aircraft where second turboshaft engine 12B may be required to supplement first turboshaft engine 12A.

In order to reduce an amount of fuel required to keep second turboshaft engine 12B idling when not needed, multi-engine power plant 10 may be configured to permit heat transfer from the exhaust gas (i.e., waste heat) of first turboshaft engine 12A to the pre-combustion air of second turboshaft engine 12B to assist with the idling of second turboshaft engine 12B. The transfer of heat to the pre-combustion air in gas path 34B second turboshaft engine 12B may cause combustor 18B to be heated to a temperature which promotes fuel ignition and flame stability. The waste heat added to second turboshaft engine 12B may permit idling of second turboshaft engine 12B with a reduced fuel flow to combustor 18B than would otherwise be required without such added heat. In some embodiments, combustor 18B of second turboshaft engine 12B may be heated to a temperature which permits auto-ignition of fuel in combustor 18B. In the event of a failure of first turboshaft engine 12A, the thermal inertia of the heat recuperation system may promote flame stability in second turboshaft engine 12B for some time.

In order to achieve such transfer of heat from first turboshaft engine 12A to second turboshaft engine 12B, multi-engine power plant 10 may comprise a cross-engine heat recuperation system including heat exchanger 36 in thermal communication with the exhaust gas of first turboshaft engine 12A and also in thermal communication with the pre-combustion air of second turboshaft engine 12B. Heat exchanger 36 may facilitate transfer of otherwise wasted heat from the exhaust gas of first turboshaft engine 12A to the pre-combustion air of second turboshaft engine 12B. In some embodiments, heat exchanger 36 may be disposed inside of exhaust duct 38A of first turboshaft engine 12A. Heat exchanger 36 may be of any suitable type. For example, heat exchanger 36 may comprise one or more first flow passages in fluid communication with the exhaust gas of first turboshaft engine 12A and one or more second flow passages in fluid communication with the pre-combustion air of the second turboshaft engine 12B where the first and second flow passages are separated by a thermally conductive heat transfer wall/element.

For example, in an embodiment where heat exchanger 36 is located in exhaust duct 38A as shown in FIG. 1, the cross-engine heat recuperation system of multi-engine power plant 10 may comprise delivery duct 40 configured to receive the pre-combustion air from gas path 34B of second turboshaft engine 12B and direct the pre-combustion air toward heat exchanger 36. In some embodiments, the pre-combustion air may be drawn from a location along gas path 34B of second turboshaft engine 12B downstream of one or more stages of compressor 16B of second turboshaft engine 12B and received into delivery duct 40. The cross-engine heat recuperation system of multi-engine power plant 10 may comprise return duct 42 configured to direct the heated pre-combustion air from heat exchanger 36 back to gas path 34B of second turboshaft engine 12B. In some embodiments, the heated pre-combustion air may be returned to gas path 34B at a location upstream of combustor 18B of second turboshaft engine 12B so that the heated pre-combustion air may heat combustor 18B as it flows through combustor 18B. For example, the heated pre-combustion air may be returned to gas path 34B at a location upstream of a liner of combustor 18B of second turboshaft engine 12B. As shown in FIG. 1, the return location of the pre-combustion air along gas path 34B may be disposed downstream of the drawing location of the pre-combustion air along gas path 34B.

In some embodiments, multi-engine power plant 10 may be configured so that some or all of the pre-combustion air from second turboshaft engine 12B is directed to heat exchanger 36 at all times when second turboshaft engine 12B is operating. Alternatively, in various embodiments, multi-engine power plant 10 may include one or more suitable flow control devices to control the flow of pre-combustion air to heat exchanger 36 in order to change the proportion of pre-combustion air being directed to heat exchanger 36 in different operating conditions. For example, in some (e.g., non-idling) operating conditions, it may be desirable for the pre-combustion air of second turboshaft engine 12B to bypass heat exchanger 36 or for a reduced amount of pre-combustion air to be directed to heat exchanger 36. In some embodiments, multi-engine power plant 10 may be configured to direct all (i.e., 100%) of the pre-combustion air of second turboshaft engine 12B to heat exchanger 36. In some embodiments, multi-engine power plant 10 may be configured to direct only a portion of the pre-combustion air of second turboshaft engine 12B to heat exchanger 36 to achieve the desired amount of heat transfer from first turboshaft engine 12A to second turboshaft engine 12B. The proportion of pre-combustion air directed to heat exchanger 36 and associated timing may depend on specific applications and operating conditions.

The configuration and location of heat exchanger 36 may be favorable for heat transfer due to the condition of the hotter fluid from which heat is taken and of the condition of the cooler fluid to which heat is transferred. Specifically, the difference in temperature and the difference in mass flow rate between the exhaust gas of first turboshaft engine 12A and the pre-combustor air of second turboshaft 12B interacting with heat exchanger 36 may represent a meaningful potential for heat transfer. For example, the exhaust gas of first turboshaft engine 12A may have a relatively high temperature and high mass flow rate in comparison with the pre-combustor air of second turboshaft 12B, which may have a lower temperature and lower mass flow rate.

For the purpose of clarity, FIG. 1 only shows one heat exchanger 36 in thermal communication with exhaust gas of first turboshaft engine 12A to transfer heat to second turboshaft engine 12B but it is understood that another heat exchanger 36 in thermal communication with exhaust gas of second turboshaft engine 12B to transfer heat to first turboshaft engine 12A could also be provided in a similar manner. This may permit either turboshaft engine 12A, 12B to be operated as a driving engine or as an idling engine.

Each turboshaft engine 12A, 12B may, for example, have its own controller 44A, 44B associated therewith. However, it is understood that in some embodiments, a single controller 44 or an overall control system may be configured to control the operation of the plurality of turboshaft engines 12A, 12B part of multi-engine power plant 10. In various embodiments, each controller 44A, 44B may include or form part of a respective Full Authority Digital Engine Control (FADEC). For example, each controller 44A, 44B may comprise one or more digital computer(s) or other data processors, sometimes referred to as electronic engine controller(s) (EEC). Controllers 44A, 44B may, for example, be configured to make decisions regarding the control of their respective turboshaft engines 12A, 12B until a pilot wishes to or is required to intervene. Controllers 44A, 44B may be configured to provide optimum engine efficiency for a given flight condition. Controllers 44A, 44B may include one or more microcontroller or other suitably programmed or programmable logic circuits.

Controllers 44A, 44B may each comprise a data storage means (e.g., device(s)) which may include a suitable combination of any type of computer memory suitable for retrievably storing machine-readable instructions executable by one or more processors of controllers 44A, 44B. Such data storage means (i.e., memory(ies)) may comprise tangible, non-transitory medium. Embodiments of the devices, systems and methods described herein may be implemented in a combination of both hardware and software. Aspects of the embodiments disclosed herein may be implemented in the form of a computer program product embodied in one or more non-transitory computer readable medium(ia) having computer readable program code (machine-readable instructions) embodied thereon. The computer program product may, for example, be executed by a controller(s) 44A, 44B to cause the execution of one or more methods disclosed herein in entirety or in part.

FIG. 2A is a schematic representation of a first control (e.g., feedback) loop 100A for controlling the operation of first turboshaft engine 12A of multi-engine power plant 10. First control loop 100A may include first controller 44A associated with first turboshaft engine 12A. FIG. 2B is a schematic representation of a second control (e.g., feedback) loop 100B for controlling the operation of second turboshaft engine 12B of multi-engine power plant 10. Second control loop 100B may include second controller 44B associated with second turboshaft engine 12B. It is understood that controllers 44A, 44B may carryout additional functions and consider additional parameters than those disclosed herein.

As explained above, first turboshaft engine 12A may be operated as a driving engine at a relatively high and constant output power level while second turboshaft engine 12B is operated as an idling/modulating engine that supplements first turboshaft engine 12A in situations of higher power demand or takes over for first turboshaft engine 12A in the event of a failure/loss of first turboshaft engine 12A. In reference to FIG. 2A, first turboshaft engine 12A may be controlled to operate at a target output power level based on specific operating conditions of the aircraft. For example, first turboshaft engine 12A may be operated at a relatively high output power level which may correspond to a relatively fuel efficient operating regime. For example, in some phases of flight or specific situations, first turboshaft engine 12A may be operated in a regime producing over 85% of the output power rating of first turboshaft engine 12A. In some phases of flight or specific situations, first turboshaft engine 12A may be operated substantially at or near maximum (i.e., 100%) output power rating of first turboshaft engine 12A. Accordingly, sensor 46A may be configured to sense a parameter that is representative of the output power level of first turboshaft engine 12A. In some embodiments, the sensed parameter may be representative of an output torque of first turboshaft engine 12A (e.g., via power shaft 26A shown in FIG. 1). In some embodiments, the sensed parameter may include a pressure (e.g., combustor pressure) within gas path 34A that is indicative of the output power level of first turboshaft engine 12A. For example, such parameter may be used to determine a ratio of a maximum pressure (P3) in gas path 34A immediately upstream of combustor 18A over an ambient pressure ($P_{amb}$) as an indication of the output power level. In some embodiments, the sensed parameter may comprise a rotational speed of a shaft of first turboshaft engine 12A to determine a gas generator corrected speed as an indication of output power level of first turboshaft engine 12A. The sensed parameter value acquired via sensor 46A may be compared against a suitable corresponding set point value 48A and the difference (i.e., error) between the sensed parameter value and the set point value 48A may be used by controller 44A to control the operation (e.g., fuel flow to combustor 18A) of turboshaft engine 12A.

In reference to FIG. 2B, second turboshaft engine 12B may be controlled to supplement first turboshaft engine 12A or to take over with driving load 28 in the event of a failure of first turboshaft engine 12A. Accordingly, second turboshaft engine 12B may be controlled based on a desired operating speed of load 28. For example, when not needed, second turboshaft engine 12B may be operated at flight idle while heat is being transferred to pre-combustion air (i.e., core air flow) of second turboshaft engine 12B in order to reduce its fuel consumption. Alternatively, when power from second turboshaft engine 12B is required, the output power level from second turboshaft engine 12B may be modulated as needed to satisfy the demand for power.

An indication of demand for power may be obtained by way of comparing an actual operating speed of load 28 with a corresponding target speed set point value 48B. For example, in the event where the maximum power output from first turboshaft engine 12A is not sufficient to maintain the target operating speed of load 28, a demand for additional power may be revealed by the actual operating speed of load 28 being lower than speed set point value 48B. Such condition may occur when there is a need for second turboshaft engine 12B to supplement the power being produced by first turboshaft engine 12A or to take over for a failed first turboshaft engine 12A. Accordingly, control loop 100B may cause second turboshaft engine 12B to power-up to take over for a failed first turboshaft engine 12A without the need for separate engine failure detection circuitry/system.

Sensor 46B may be configured to sense an actual speed value representative of an actual output speed of the multi-engine power plant 10, which may be related to an operating speed of load 28. In a case where load 28 is a rotary wing of an aircraft, sensor 46B may be configured to sense a rotational speed of such rotary wing. In some embodiments, sensor 46B may be configured to sense a rotational speed of output shaft 32 of multi-engine power plant 10. In some embodiments, sensor 46B may be configured to sense a rotational speed of power shaft 26A of first turboshaft engine 12A. The sensed speed value acquired via sensor 46B may be compared against a suitable corresponding speed set point value 48B and the difference (i.e., error) between the sensed speed value and the speed set point value 48B may be used by controller 44B to control the operation (e.g., fuel flow to combustor 18B) of turboshaft engine 12B.

Figure 3A:
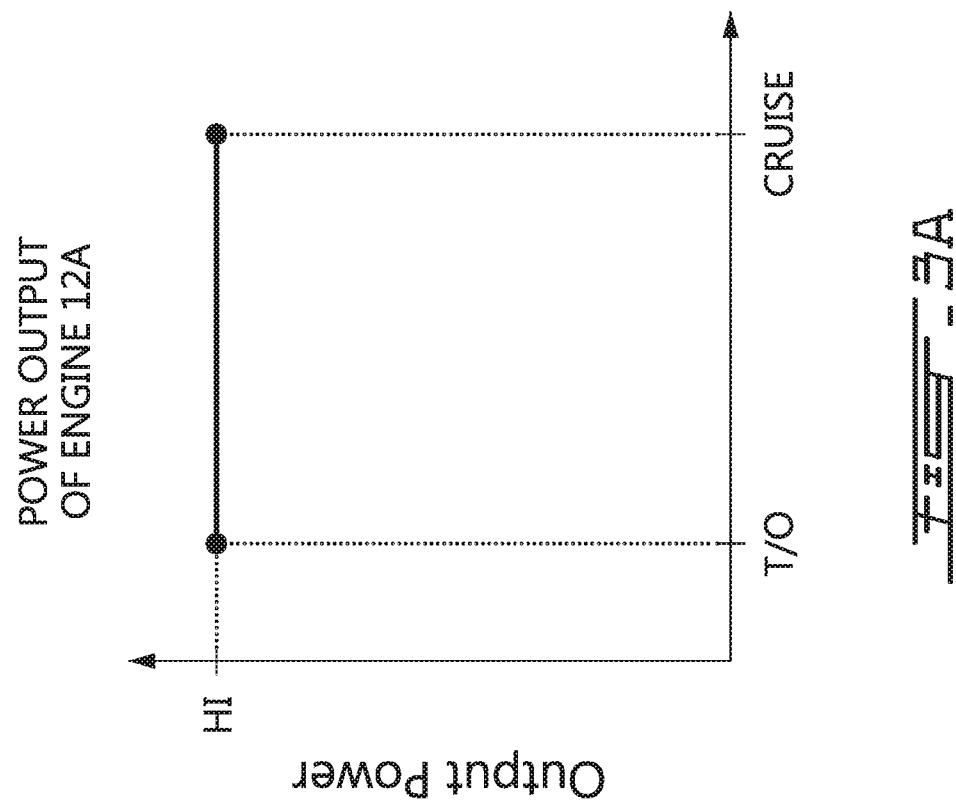
FIG. 3A is a graph illustrating exemplary output power levels of the first engine of the multi-engine power plant of FIG. 1 during take-off and a cruise phase of flight of an aircraft.

FIG. 3A is a graph illustrating exemplary output power levels of first turboshaft engine 12A during take-off and a cruise phase of flight of an aircraft (e.g., helicopter) powered by multi-engine power plant 10. FIG. 3B is a graph illustrating exemplary output power levels of second turboshaft engine 12B of during the same take-off and cruise phases of flight of the same aircraft. Since first turboshaft engine 12A is the driving engine in the example illustrated herein, the output power level of first turboshaft engine 12A may be relatively high (e.g., 85% to 100% of maximum power rating) at take-off and also during cruise as shown in FIG. 3A so that first turboshaft engine 12A may operate within a relatively fuel-efficient regime. In some embodiments, the output power level of first turboshaft engine 12A may be relatively constant from take-off to the cruise phase of flight. On the other hand, since second turboshaft engine 12B is operated as the idling/modulating engine in the example illustrated herein, the output power level of second turboshaft engine 12B may be relatively high (e.g., 85% to 100% of maximum power rating) at take-off but may be relatively low during cruise when the output power from first turboshaft engine 12A alone may be sufficient. In some situations, second turboshaft engine 12B may be operating at idle (e.g., flight idle) while waste heat from first turboshaft engine 12A is transferred thereto to reduce its fuel consumption at idle as explained above. Since second turboshaft engine 12B is idling and not shut down, it's output power level may be readily modulated based on demand for power to drive load 28.

Figure 4:
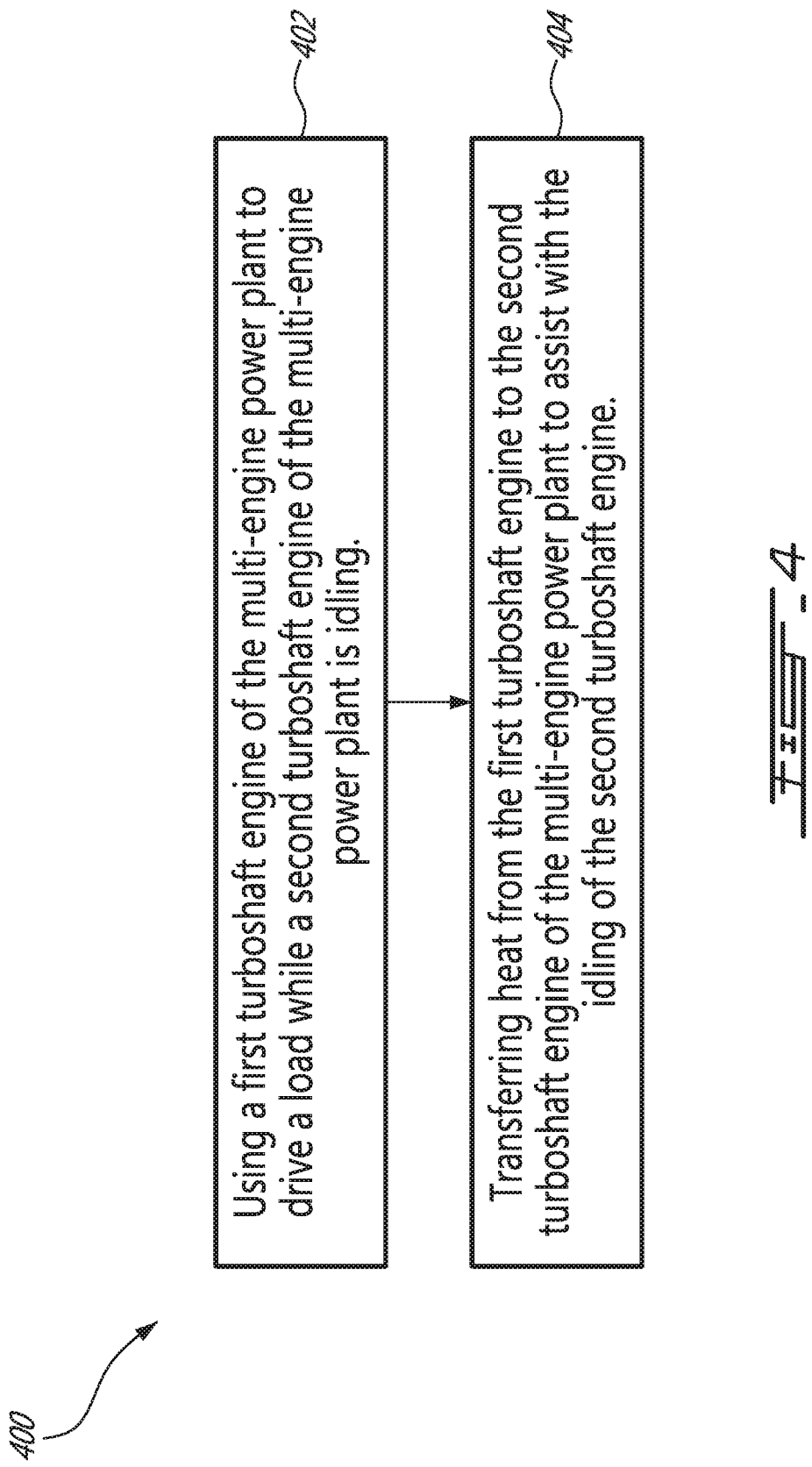
FIG. 4 is a flowchart illustrating an exemplary method of operating the multi-engine power plant of FIG. 1.

FIG. 4 is a flowchart illustrating an exemplary method 400 of operating multi-engine power plant 10. Aspects of multi-engine power plant 10 described above may also be applicable to method 400. In some embodiments, method 400 may comprise: using first turboshaft engine 12A of multi-engine power plant 10 to drive load 28 while second turboshaft engine 12B of multi-engine power plant 10 is idling (see block 402); and transferring heat from first turboshaft engine 12A to second turboshaft engine 12B of multi-engine power plant 10 to assist with the idling of second turboshaft engine 12B (see block 404).

In some embodiments, method 400 may comprise transferring heat from an exhaust gas of first turboshaft engine 12A to pre-combustion air of second turboshaft engine 12B of multi-engine power plant 10. The heat may be transferred to the pre-combustion air at a location along gas path 34 of second turboshaft engine 12B downstream of one or more stages of compressor 16 of second turboshaft engine 12B.

In some embodiments of method 400, load 28 may be a rotary wing of an aircraft. For example, load 28 may be a main rotor of a helicopter. In some embodiments, second turboshaft engine 12B may be idling while the aircraft is in flight.

In some embodiments, method 400 may comprise modulating an output power level of second turboshaft engine 12B based on a difference between an operating speed of load 28 and a corresponding set point value 48B.

In some embodiments, method 400 may comprise operating first turboshaft engine 12A at a substantially constant output power level while the output power level of second turboshaft engine 12B is modulated (e.g., based on demand for additional power).

In some embodiments, method 400 may comprise receiving a sensed operating speed (e.g., via sensor 46B) of load 28 that is lower than a corresponding set point value 48B and increasing an output power level of second turboshaft engine 12B. First turboshaft engine 12A may be operated at a substantially constant output power level while the output power level of second turboshaft engine 12B is increased.

FIG. 5 is a flowchart illustrating an exemplary method 500 of operating the multi-engine power plant 10 drivingly coupled to a rotary wing (i.e., load 28) of an aircraft during flight of the aircraft. Aspects of multi-engine power plant 10 described above may also be applicable to method 500. In some embodiments, method 500 may comprise: operating first turboshaft engine 12A of multi-engine power plant 10 to drive the rotary wing of the aircraft during flight while second turboshaft engine 12B of multi-engine power plant 10 is idling (see block 502); transferring heat from an exhaust gas of first turboshaft engine 12A to pre-combustion air of the idling second turboshaft engine 12B of multi-engine power plant 10 (see block 504); receiving a sensed speed value representative of an actual output speed of multi-engine power plant 10 where the sensed speed value is lower than a corresponding set point value 48B (see block 506); and increasing an output power level of second turboshaft engine 12B to drive the rotary wing of the aircraft (see block 508).

In some embodiments, method 500 may comprise transferring heat to the pre-combustion air at a location along gas path 34B of second turboshaft engine 12B downstream of one or more stages of compressor 16 of second turboshaft engine 12B.

In some embodiments, method 500 may comprise: receiving the pre-combustion air from a location along gas path 34 of second turboshaft engine 12B downstream of a stage of compressor 16 of second turboshaft engine 12B; directing the pre-combustion air toward heat exchanger 36 in thermal communication with the exhaust gas of first turboshaft engine 12A; and directing the heated pre-combustion air from heat exchanger 36 to a location along gas path 34B of second turboshaft engine 12B upstream of combustor 18B of second turboshaft engine 12B.

In some embodiments, heat exchanger 36 is disposed inside exhaust duct 38 of first turboshaft engine 12A.

In some embodiments, method 500 may comprise operating first turboshaft engine 12A at a substantially constant output power level while the output power level of second turboshaft engine 12B is increased.

In some embodiments, method 500 may comprise, after increasing the output power level of second turboshaft engine 12B, modulating the output power level of second turboshaft engine 12B based on a difference between the sensed speed value representative of the actual output speed of multi-engine power plant 10 and the corresponding set point value 48B.

In some embodiments, method 500 may comprise operating first turboshaft engine 12A at a substantially constant output power level while the output power level of second turboshaft engine 12B is modulated.

The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified. The present disclosure may be embodied in other specific forms without departing from the subject matter of the claims. Also, one skilled in the relevant arts will appreciate that while the systems and devices disclosed and shown herein may comprise a specific number of elements/components, the systems and devices could be modified to include additional or fewer of such elements/components.

The present disclosure is also intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A method of operating a multi-engine power plant drivingly coupled to a rotary wing of an aircraft during flight of the aircraft, the method comprising:
    operating a first turboshaft engine of the multi-engine power plant to drive the rotary wing of the aircraft during flight while a second turboshaft engine of the multi-engine power plant is idling;
    transferring heat from an exhaust gas of the first turboshaft engine to pre-combustion air upstream of a combustor of the idling second turboshaft engine of the multi-engine power plant;
    receiving a sensed speed value representative of an actual output speed of the multi-engine power plant where the sensed speed value is lower than a corresponding set point value; and
    increasing an output power level of the second turboshaft engine to drive the rotary wing of the aircraft, wherein the first turboshaft engine is operated at a substantially constant output power level while the output power level of the second turboshaft engine is increasing.

2. The method as defined in claim 1, comprising transferring heat to the pre-combustion air at a location along a gas path of the second turboshaft engine downstream of a compressor stage of the second turboshaft engine.

3. The method as defined in claim 1, comprising:
    receiving the pre-combustion air from a location along a gas path of the second turboshaft engine downstream of a compressor stage of the second turboshaft engine;
    directing the pre-combustion air toward a heat exchanger in thermal communication with the exhaust gas of the first turboshaft engine; and
    directing the pre-combustion air from the heat exchanger to a location along the gas path of the second turboshaft engine upstream of the combustor of the second turboshaft engine.

4. The method as defined in claim 3, wherein the heat exchanger is disposed inside an exhaust duct of the first turboshaft engine.

5. The method as defined in claim 1, further comprising, after increasing the output power level of the second turboshaft engine, modulating the output power level of the second turboshaft engine based on a difference between the sensed speed value representative of the actual output speed of the multi-engine power plant and the corresponding set point value.

6. The method as defined in claim 5, comprising operating the first turboshaft engine at a substantially constant output power level while the output power level of the second turboshaft engine is modulated.

7. A method of operating a multi-engine power plant of an aircraft, the method comprising:
    using a first turboshaft engine of the multi-engine power plant to drive a load while a second turboshaft engine of the multi-engine power plant is idling;
    transferring heat from the first turboshaft engine to pre-combustion air upstream of a combustor of the second turboshaft engine of the multi-engine power plant to assist with the idling of the second turboshaft engine;
    receiving a sensed operating speed of the load that is lower than a corresponding set point value; and
    increasing an output power level of the second turboshaft engine, wherein the first turboshaft engine is operated at a substantially constant output power level while the output power level of the second turboshaft engine is increasing.

8. The method as defined in claim 7, comprising transferring heat from an exhaust gas of the first turboshaft engine to the pre-combustion air of the second turboshaft engine of the multi-engine power plant.

9. The method as defined in claim 8, comprising transferring heat to the pre-combustion air at a location along a gas path of the second turboshaft engine downstream of a compressor stage of the second turboshaft engine.

10. The method as defined in claim 7, wherein the load is a rotary wing of the aircraft and the aircraft is in flight while the second turboshaft engine is idling.

11. The method as defined in claim 7, further comprising modulating an output power level of the second turboshaft engine based on a difference between an operating speed of the load and a corresponding set point value.

12. The method as defined in claim 11, comprising operating the first turboshaft engine at a substantially constant output power level while the output power level of the second turboshaft engine is modulated.

13. A multi-engine power plant for an aircraft, the power plant comprising:
    a first turboshaft engine and a second turboshaft engine, the first turboshaft engine and the second turboshaft engine being configured to drive a common load;
    a heat exchanger in thermal communication with an exhaust gas of the first turboshaft engine and in thermal communication with pre-combustion air of the second turboshaft engine, the heat exchanger being configured to, in use, permit heat transfer from the exhaust gas of the first turboshaft engine to the pre-combustion air of the second turboshaft engine;
    a first duct configured to receive the pre-combustion air from a location along a gas path of the second turboshaft engine downstream of a compressor stage of the second turboshaft engine and direct the pre-combustion air toward the heat exchanger;
    a second duct configured to direct the pre-combustion air from the heat exchanger to a location along the gas path of the second turboshaft engine upstream of a combustor of the second turboshaft engine;
    a first control loop configured to control the first turboshaft engine based on a desired output power level of the first turboshaft engine; and
    a second control loop configured to:
        control the second turboshaft engine based on the desired operating speed of the common load;

cause the second turboshaft engine to idle when the desired output power level of the first turboshaft engine is sufficient to maintain the desired operating speed of the common load; and cause an increase in output power level of the second turboshaft engine when the desired output power level of the first turboshaft engine is insufficient to maintain the desired operating speed of the common load.

14. The power plant as defined in claim 13, wherein the heat exchanger is disposed inside an exhaust duct of the first turboshaft engine.

\* \* \* \* \*